US012244080B2

(12) United States Patent
Sakr et al.

(10) Patent No.: US 12,244,080 B2
(45) Date of Patent: Mar. 4, 2025

(54) PHASED ANTENNA ARRAY WITH PERFORATED AND AUGMENTED ANTENNA ELEMENTS

(71) Applicant: Analog Devices International Unlimited Company, Limerick (IE)

(72) Inventors: Ahmed A. Sakr, Cairo (EG); Islam A. Eshrah, Giza (EG)

(73) Assignee: Analog Devices International Unlimited Company, Limerick (IE)

( * ) Notice: Subject to any disclaimer, the term of this patent is extended or adjusted under 35 U.S.C. 154(b) by 170 days.

(21) Appl. No.: 18/067,820

(22) Filed: Dec. 19, 2022

(65) Prior Publication Data

US 2023/0253709 A1 Aug. 10, 2023

Related U.S. Application Data

(60) Provisional application No. 63/297,355, filed on Jan. 7, 2022.

(51) Int. Cl.
*H01Q 9/04* (2006.01)
*H01Q 3/26* (2006.01)

(52) U.S. Cl.
CPC ........... *H01Q 9/045* (2013.01); *H01Q 9/0414* (2013.01); *H01Q 9/0435* (2013.01); *H01Q 3/26* (2013.01)

(58) Field of Classification Search
CPC ........ H01Q 1/523; H01Q 3/26; H01Q 9/0407; H01Q 9/045; H01Q 9/0414; H01Q 9/0435;

(Continued)

(56) References Cited

U.S. PATENT DOCUMENTS

| | | | |
|---|---|---|---|
| 10,998,633 B2 | 5/2021 | Nasimuddin et al. | |
| 2020/0076055 A1 | 3/2020 | Jeon | |

(Continued)

FOREIGN PATENT DOCUMENTS

| | | | | |
|---|---|---|---|---|
| CN | 113506976 A | 6/2021 | | |
| EP | 2159878 A1 * | 3/2010 | ........... | H01Q 21/065 |
| JP | WO2008132785 A1 * | 7/2010 | | |

OTHER PUBLICATIONS

Extended European Search Report issued in EP Application No. 23150513.2, dated Jun. 5, 2023.

(Continued)

*Primary Examiner* — Daniel Munoz
(74) *Attorney, Agent, or Firm* — Knobbe, Martens, Olson & Bear, LLP

(57) ABSTRACT

Systems, devices, and methods related to antenna elements with perforations and augmentations are provided. An example patch antenna structure includes a first conductive patch on a first layer of the structure, where the first conductive patch includes one or more perforations at a periphery of a first side of the first conductive patch, and one or more extended conductive portions at a second side of the first conductive patch, the second side opposite the first side; a ground plane on a ground layer of the structure, the ground layer spaced apart from the first layer; and a first signal feed to couple a signal to the first conductive patch. In an example, an individual extended conductive portion of the one or more extended conductive portions may compensate a radiation pattern associated with a corresponding one of the one or more perforations.

20 Claims, 9 Drawing Sheets

(58) Field of Classification Search
CPC ... H01Q 21/0081; H01Q 21/06; H01Q 21/065
See application file for complete search history.

(56) References Cited

U.S. PATENT DOCUMENTS

| | | | | |
|---|---|---|---|---|
| 2020/0365995 | A1 | 11/2020 | Hamabe | |
| 2023/0261392 | A1 * | 8/2023 | Sakr | H01Q 21/065 343/702 |

OTHER PUBLICATIONS

James et al., "Handbook of Microstrip Antennas, passage", Handbook of Microstrip Antennas, Jan. 1, 1989, pp. 320-330.
Boldaji et al., *Method of Decoupling and Independently Tuning the Second Mode of a Microstrip-Fed Slot Antenna Using Series Inductive Loading*, IEEE Antennas and Wireless Propagation Letters, vol. 12, 2013, 4 pages.
Deshmukh et al., *Compact Broadband Slotted Rectangular Microstrip Antenna*, IEEE Antennas and Wireless Propagation Letters, vol. 8, 2009, 4 pages.
Dang et al., *A Compact Microstrip Slot Triple-Band Antenna for WLAN/WiMAX Applications*, IEEE Antennas and Wireless Propagation Letters, vol. 9, 2010, 4 pages.
Lian et al., *Design of a Low-Profile Dual-Polarized Stepped Slot Antenna Array for Base Station*, IEEE Antennas and Wireless Propagation Letters, vol. 15, 2016, 4 pages.
Ambresh et al., *Effect of Slots on Microstrip Patch Antenna Characteristics*, International Conference on Computer, Communication and Electrical Technology, ICCET2001, Mar. 18 and 19, 2011, 3 pages.

* cited by examiner

600

PHASED ANTENNA ARRAY WITH PERFORATED AND AUGMENTED ANTENNA ELEMENTS

CROSS REFERENCE TO RELATED APPLICATIONS

The present application claims priority to and the benefit of the U.S. Provisional Patent Application No. 63/297,355 entitled "PERFORATED AND AUGMENTED ANTENNA ELEMENT FED BY MULTICHANNEL BEAMFORMER FOR WIDE SCAN RANGE PHASED ARRAYS" and filed Jan. 7, 2022, which is hereby incorporated by reference in its entirety as if fully set forth below and for all applicable purposes.

TECHNICAL FIELD OF THE DISCLOSURE

The present disclosure generally relates to electronics, and more particularly to antennas used in radio frequency (RF) systems.

BACKGROUND

RF systems are systems that transmit and receive signals in the form of electromagnetic waves with a frequency range of approximately 3 kilohertz (kHz) to 300 gigahertz (GHz). RF systems are commonly used for wireless communications, with cellular/wireless mobile technology being a prominent example.

In the context of RF systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave to produce an electric current at its terminals, where the electric current is subsequently applied to a receiver to be amplified. Antennas are essential components of all radio equipment, and are used in radio broadcasting, broadcast television, two-way radio, communications receivers, radar, cell phones, satellite communications and other devices.

An antenna with a single antenna element may broadcast a radiation pattern that radiates equally in all directions in a spherical wavefront. Phased array antennas may generally refer to a collection of antenna elements that are used to focus electromagnetic energy in a particular spatial direction, thereby creating a main beam. Phased array antennas may offer numerous advantages over single antenna systems, such as high gain, ability to perform directional steering, and simultaneous communication. Therefore, phased array antennas may be used more frequently in a myriad of different applications, such as in military applications, mobile technology, on airplane radar technology, automotive radars, cellular telephone and data, and Wi-Fi technology.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1A:
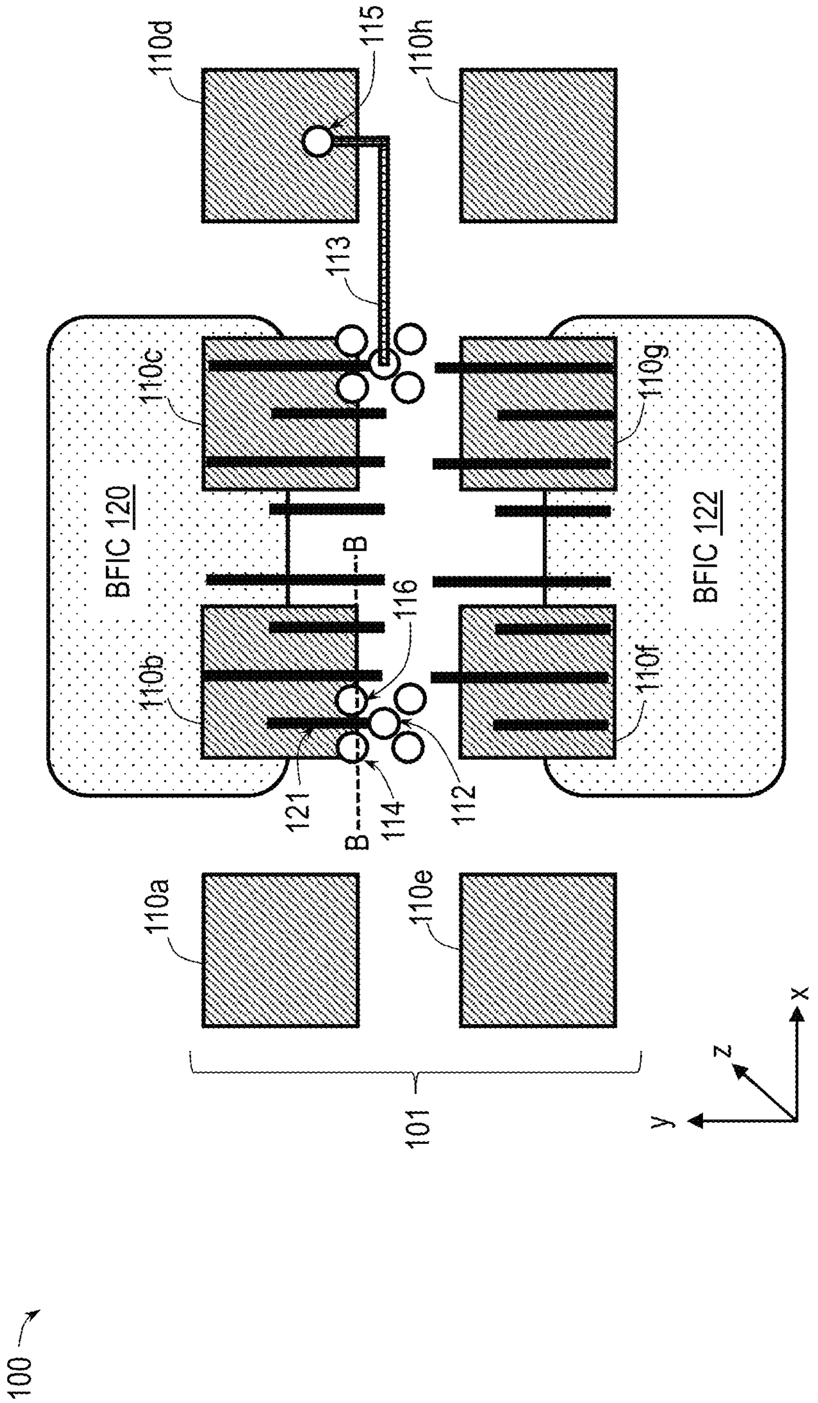
FIG. 1A illustrates a top view of an exemplary antenna array system, according to some embodiments of the disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

As described above, antennas can be used in an RF system to transmit and/or receive radio waves wirelessly through space. As the demand for wireless communication continues to grow, there is an interest in developing wireless communications over millimeter wave bands due to the large bandwidths available at these high frequencies. For instance, fifth generation (5G) systems and networks may utilize 28 GHz and 39 GHz millimeter spectrum bands to provide services with higher data rates and/or lower latencies than services provided in lower frequency bands. Furthermore, the large frequency bandwidth may allow for many frequency channels in which a wireless communication device (e.g., a base station or a user equipment (UE)) may scan for communications. To that end, phased array antennas are commonly used for frequency scanning. In some examples, a phased array antenna may include an array of antenna elements mounted on a printed circuit board (PCB). A PCB is used to mechanically support and electrically connect electronic components using conductive pathways, tracks or signal traces etched from metal sheets (e.g., copper sheets) laminated onto a non-conductive substrate (e.g., insulating material).

In an example, a phased antenna array may be excited by beamformer chip(s). For instance, the phase antenna array and the beamformed chip(s) may be disposed on a multilayered PCB. Beamforming is a technique by which an array of antennas can be steered to transmit radio signals or receive radio signals in a specific spatial direction. Beamforming may include adjusting the phases of signals transmitted by or received from the antenna elements so that the transmitted or received signals may provide constructive interference in the desired spatial direction and destructive interference in other spatial directions. The excitations may be handled by a through coaxial via (which may be referred to as a feeding via) that goes from a beamformer chip to an antenna element. Because such a beamformer may have multiple channels to feed multiple antenna elements in the array, the feeding or excitation vias are to be isolated from each other to avoid mutual coupling among those antenna elements. One approach to provide such isolation is to surround an excitation via with shielding vias. In some examples, shielding vias may be grounded vias. The shielding vias surrounding or adjacent to a certain excitation via can reduce noise interference from signals at neighboring excitation vias and may generally improve signal integrity at the certain excitation via.

In some example configurations, shielding vias can hit the antenna elements in random positions. That is, an antenna element may have portions, for example, near an edge of the antenna element, randomly removed or punctured out to accommodate for the shielding vias. Because current distribution may be at a maximum around the edges of the antenna element (e.g., in an edge region of the antenna element with a width of about one tenth of a guided wavelength), the removal of portions near the edges can greatly degrade the performance of the antenna element, for example, in terms of radiation patterns and signal strengths.

There are generally two options to provide shielding vias with backdrilling. Backdrilling may refer to the process of creating vias by removing stubs (e.g., unnecessary or unused portion of a via) in a multi-layered PCB, to allow signal(s) to flow from one layer to another layer. In a first option, holes (e.g., openings, slots, or perforations) of the via pad are created in the antenna elements (e.g., by removing or puncturing out portions of the antenna elements) and the perforations are left empty (i.e., air-filled and non-plated). In a second option, holes or openings in antenna elements can be epoxy-filled and plated over, resulting in antenna elements with augmented areas. In any case, antenna elements with perforations alone or with plating can modify and/or degrade the performance of the antenna elements, for example, in terms of radiation patterns and signal strengths.

Accordingly, the present disclosure provides techniques to improve the performance of antenna elements with random perforations or augmentations due to the accommodation of shielding vias. In one aspect of the present disclosure, a first example patch antenna structure may include a first conductive patch on a first layer of the structure. The first conductive patch may include an electrically conductive material. The first conductive patch may include one or more perforations at a periphery (e.g., regions near the edges or at an outer perimeter) of a first side of the first conductive patch. The perforations may be areas or portions that are removed to accommodate for shielding vias as discussed above using the first option. Because the perforations at the periphery of the first conductive patch can degrade the performance (e.g., radiation, signal strength) of the first conductive patch, the first conductive patch may include one or more extended conductive portions (or added portions) at an opposing second side. The extended conductive portions can compensate or counterbalance the undesirable radiation pattern caused by the perforations. In an example, the first conductive patch may have a substantially squared shape with the one or more perforations (e.g., cut-out region(s), removed portion(s), notches) on the first side and with the extended portions (e.g., added portions or protruding portions) on the opposing second side. The first patch antenna structure may further include a ground plane on a ground layer of the structure, where the ground layer may be spaced apart from the first layer (e.g., by alternating conductive and insulating layers or dielectric layers). The first patch antenna structure may further include a first signal feed to couple a signal (e.g., from a beamformer) to the first conductive patch. In an example, the one or more perforations for the shielding vias may proximate (or surround) the first signal feed to shield the first signal feed from coupling with other signal feeds (e.g., from other beamformer channels).

In some aspects, an extended conductive portion may be added to counterbalance each perforation. That is, each of the one or more perforations may have a corresponding one of the one or more extended conductive portions. Furthermore, each extended conductive portion may be symmetrically added to the second side. For instance, a location of a first perforation of the one or more perforations may be about symmetrical to a location of a corresponding one of the one or more extended conductive portions at a center axis of the first conductive patch. The center axis may extend from a third side of the first conductive patch to an opposing fourth side of the first conductive patch, where the third side may be adjacent to the first and second sides. In some aspects, an area of a first extended conductive portion of the extended conductive portions is based on an area of a corresponding one of the one or more perforations. For instance, the conductive area of the first extended conductive portion may be about the same as the area of the first perforation so that the first extended conductive portion can compensate the radiation loss due to the first perforation.

As discussed above, the first conductive patch may originally have a substantially square shape before the perforations and extensions. The originally designed or desired resonance frequency and/or operational bandwidth may change after the perforations and extensions. To adjust or tune the resonance frequency and/or operational bandwidth of the perforated, extended first conductive patch, the first patch antenna structure can include a second conductive patch on a second layer of the structure, where the second layer may be between the first layer and the ground layer and spaced apart from the first layer by a dielectric material. The second conductive patch may also include an electrically conductive material. In some examples, the first conductive patch can be referred to as an upper patch, the second conductive patch may be referred to as a lower patch. In some aspects, the first signal feed may be electrically coupled to the first conductive patch and capacitively (or parasitically) coupled to the second conductive patch. In such a configuration, the first conductive patch or upper patch may be a radiating patch, and the second conductive patch or lower patch may be a non-radiating patch. In other aspects, the first signal feed may be electrically coupled to the second conductive patch and capacitively (or parasitically) coupled to the first conductive patch. In such a configuration, the first patch antenna structure may be referred to as a stacked patch antenna, where the first and second conductive patch may operate as radiating elements.

In some aspects, the first patch antenna structure may support dual polarization. To that end, the first patch antenna structure may further include a second signal feed to couple another signal to the first conductive patch. The first signal feed may be associated with a first polarization, and the second signal feed may be associated with a second polarization different from (e.g., orthogonal to) the first polarization. For instance, the first polarization may be one of a horizontal-polarization (H-pol) or a vertical-polarization (V-pol), and the second polarization may be the other one of the H-pol or V-pol.

In another aspect of the present disclosure, a second example patch antenna structure may include a first conductive patch on a first layer of the structure, wherein the first conductive patch includes one or more plated holes at a periphery of a first side of the first conductive patch. The one or more plated holes may be an area or portion that are removed, filled with an epoxy material, and plated over (e.g., cover by a plate) to accommodate for shielding vias as discussed above using the second option. Because the augmented (or increased) area of the first conductive patch can modify or degrade the performance (e.g., radiation, signal strength) of the first conductive patch, the first conductive patch can include one or more cut-out regions at an opposing second side of the first conductive patch. The cut-out regions can compensate or counterbalance the undesirable radiation pattern caused by the augmentations. In an example, the first conductive patch may have a substantially squared shape with the one or more plated holes (e.g., augmentation(s) and extended portion(s)) on the first side and with the one or more cut-out regions (e.g., removed portions, slots, openings) on the second side. The second patch antenna structure may further include a ground plane on a ground layer of the structure, where the ground layer may be spaced apart from the first layer (e.g., by alternating conductive and insulating or dielectric layers). The second patch antenna structure may further include a first signal feed to couple a signal (e.g., from a beamformer) to the first conductive patch. In an example, the one or more plated holes for the shielding vias may proximate (or surround) the first signal feed to shield the first signal feed from coupling with other signal feeds (e.g., from other beamformer channels).

Similar to the first patch antenna structure, each of the one or more plated holes may correspond to one of the one or more cut-out regions. Further, each cut-out region may be symmetrically removed. For instance, a location of a first cut-out region of the one or more cut-out regions may be symmetrical to a location of a corresponding one of the one or more plated holes at a center axis of the first conductive patch. The center axis may extend from a third side to an opposing fourth side of the first conductive patch, where the third side is adjacent to the first and second sides. Further, the second patch antenna structure may also include a second conductive patch on a second layer of the structure to adjust a resonant frequency and/or operational bandwidth of the second patch antenna structure, where the second layer may be between the first layer and the ground layer and spaced apart from the first layer by a dielectric material. Further, the first signal feed may be electrically coupled to one of the first conductive patch or the second conductive patch and capacitively (parasitically) coupled to the other one of the first conductive patch or the second conductive patch. Further, the second patch antenna structure may also support dual polarization. To that end, the first patch antenna structure may further include a second signal feed to couple another signal to the first conductive patch. The first signal feed may be associated with a first polarization (e.g., one of H-pol or V-pol), and the second signal feed may be associated with a second polarization (e.g., the other one of H-pol or V-pol) different from the first polarization.

In a further aspect of the present disclosure, an antenna array apparatus may include a plurality of antenna elements and beamformer circuitry coupled to one or more of the plurality of antenna elements. One or more of the antenna elements may have a structure as described above for the first patch antenna structure or the second patch antenna structure. The beamformer circuitry may include a plurality of beamformer channels, which may be coupled to (e.g., to feed signals to) at least some of the antenna elements.

The systems, schemes, and mechanisms described herein advantageously improve patch antenna that have random perforations and/or plated holes due to accommodation of shielding vias in an antenna array apparatus or system. For example, adding extended conductive portions to edge(s) of a patch antenna with perforations at opposing edge(s) can compensate or counterbalance the radiation loss due to the perforations. Alternatively, removing or creating cut-outs at edge(s) in a patch antenna with plated holes at opposing edge(s) can compensate or counterbalance the radiation changes due to the plated holes (or augmentations). The present disclosure allows for placement of shielding vias at any suitable locations to improve signal integrity at excitation vias without degrading the performance of antenna elements even though the antenna elements can be randomly perforated to accommodate the shielding vias.

FIG. 1A illustrates a top view of an exemplary antenna array system 100, according to some embodiments of the disclosure. The top view may be in an y-x plane of the x-y-z coordinate system shown in FIG. 1A. The antenna array system 100 may be used in an RF system for wireless transmission and/or reception. In some instances, the antenna array system 100 may be part of the antenna apparatus 700 of FIG. 7. As shown in FIG. 1, the antenna array system 100 may include an antenna array 101, a beamformer integrated circuit (BFIC) 120, and a BFIC 122. The antenna array 101 may include a plurality of antenna elements 110 (individually shown as 110*a*, 110*b*, 110*c*, 110*d*, 110*e*, 110*f*, 110*g*, and 110*h*). For simplicity of illustration, FIG. 1A illustrates eight antenna elements 110 and two BFICs 120 and 122. However, the antenna array 101 can include any suitable number of antennal elements 110 (e.g., 2, 4, 5, 6, 7, 9, 10, 16, 32, 64 or more) and the system 100 can include any suitable number of BFICs 120 and 122 (e.g., 1, 3, 4 or more).

Figure 1B:
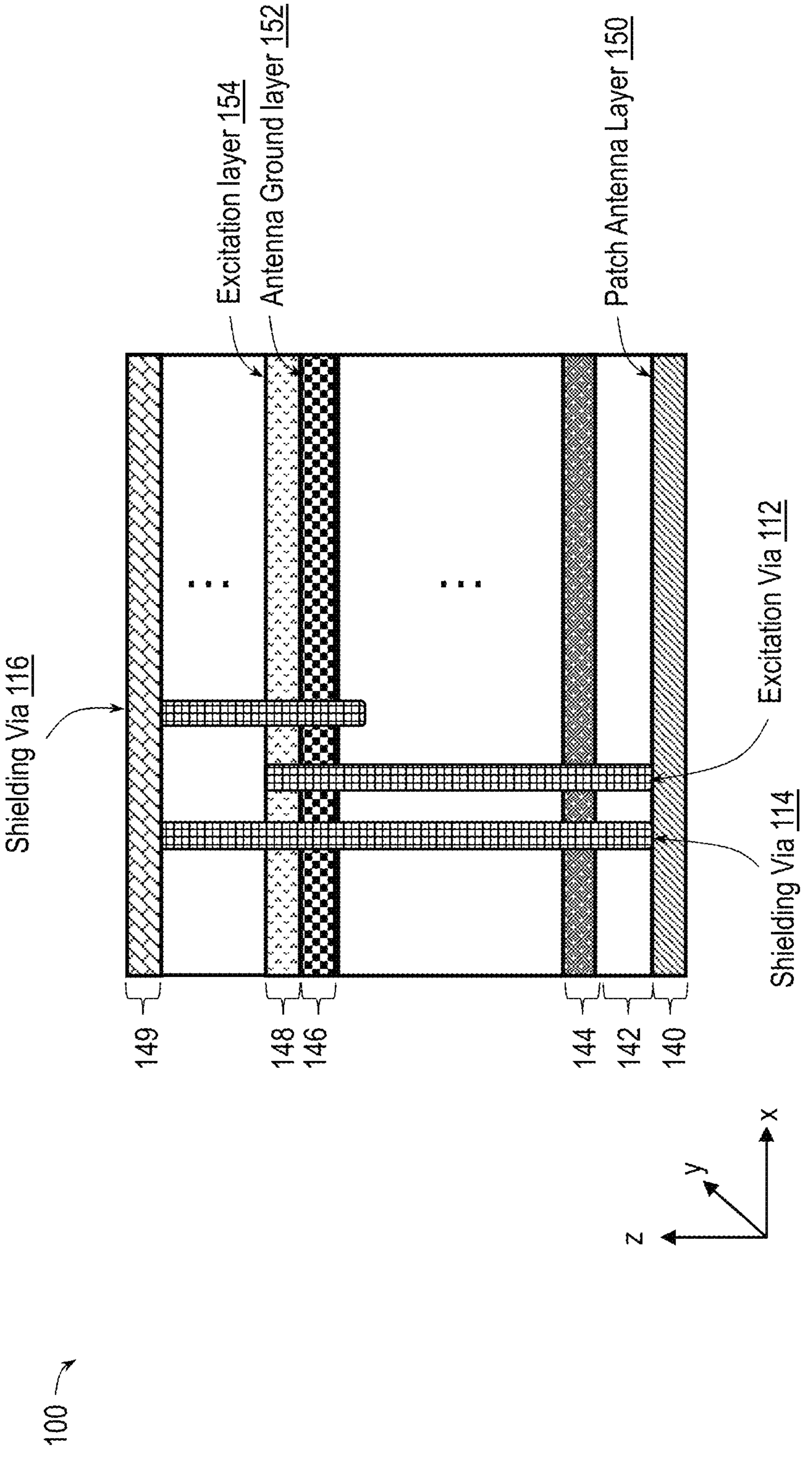
FIG. 1B illustrates a cross-sectional side view of an exemplary antenna array system, according to some embodiments of the disclosure.

In various examples, the system 100 may be a multi-layered PCB system, and the BFICs 120 and 122 may be on a different layer of the PCB system than the antenna array 101. The BFICs 120 and 122 can also be on different layers. Furthermore, in some examples, the antenna array 101 can include antenna elements 110 on different layers of the multi-layered PCB system. A more detailed vies of the multi-layered system is shown in FIG. 1B and will be discussed more fully below with reference to FIG. 1B.

As further shown in FIG. 1A, each of the BFICs 120 and 122 may include multiple beamformer channels 121 (shown by the thick black lines and only one of which is labeled with a reference numeral in FIG. 1A in order to not clutter the drawing). A beamformer channel may include phase-shifters, amplifiers, transmit/receive switches, and/or input/output ports (e.g., similar to the beamformers 722 shown in FIG. 7). Each beamformer channel 121 may perform beamforming operations independent from each other. Each beamform channel 121 may generate one of the phase-shifted and/or gain-adjusted signals in the set. For transmission, the plurality of beamformer channels 121 may be coupled to at least a subset of the antenna elements 110 to feed the set of phase-shifted and/or gain-adjusted signals to the subset of the antenna elements 110. More specifically, each beamformer channel 121 may feed a different one of the phase-shifted and/or gain-adjusted signals to a different antenna element 110 in the subset. That is, each antenna element 110 in the subset may transmit the same signal but with different phases and/or gains. A signal radiated or emitted by the antenna array 101 may have a radiation pattern with a main beam (e.g., directing to a particular direction) generated based on constructive interference of RF signals emitted by the subset of the antenna elements 110. In the illustrated example of FIG. 1, the BFIC 120 may have beamformer channels 121 coupled to the antenna elements 110*b* and 110*c* while the BFIC 122 may have beamformer channels 121 coupled to the antenna elements 110*f* and 110*g*. In some examples, the BFIC 120 may operate to beamform signals in one frequency band while the BFIC 122 may operate to beamform signals in another frequency band.

As further shown in FIG. 1A, the beamformer channel 121 of the BFIC 120 may be coupled to an excitation via 112 so that a signal from the beamformer channel 121 may be fed to the antenna element 110*b*. Further, shielding vias 114 and 116 may be added to isolate the signal fed by the excitation via 112, causing random perforations to the antenna element 110*b*. In general, each of the empty-filled circles in FIG. 1A may represent a via. A via may generally be an electrical connection between different layers of a PCB. In some examples, an excitation line 113 can be fed from a different layer of the multi-layered PCB system to an excitation via 115 of the antenna element 110*d*.

While not shown in FIG. 1A, the antenna elements 110*f* and 110*g* can also include excitation vias (for coupling to the beamformer channels 121 of the BFIC 122) and shielding vias similar to the excitation vias 112 and the shielding vias 114 and 116, respectively.

FIG. 1B illustrates a cross-sectional side view of the exemplary antenna array system 100 of FIG. 1A, according to some embodiments of the disclosure. The cross-sectional side view may be taken along the line B-B of FIG. 1A. The cross-sectional side view may be in an z-x plane of the x-y-z coordinate system of FIGS. 1A-1B. As shown in FIG. 1B, the system 100 may be a multi-layered PCB system including conductive layers alternating with insulating or dielectric layers vertically along the z-axis. In the illustrated example, the system 100 may include a conductive layer 140, followed by an insulating layer 142 (e.g., including dielectric material) on top of the conductive layer 140, and then another conductive layer 144 on top of the insulating layer 142, and so on. The layer 140 may be a patch antenna layer 150 on which the antenna elements 110 of FIG. 1A may be disposed. The system 100 may include a further layer 146 spaced apart from the layer 140 (on which the antenna elements 110 are disposed). The layer 146 may be an antenna ground layer 152, operating as an antenna ground plane for the system 100. The system 100 may further include a conductive layer 148 on top of the layer 146. The layer 148 may be an excitation layer 154 on which excitation lines (e.g., from the BFIC 120 and/or or 122) may be disposed.

As further in shown in FIG. 1B, the excitation via 112 (e.g., a vertical electrical conductor) may extend between the patch antenna layer 150 and the excitation layer 154. For instance, the excitation via 112 may have one end electrically coupled to the patch antenna layer 150 and an opposing end electrically coupled to the excitation layer 154. In some instances, the excitation via 112 can extend between the layer 148 and 144 instead, for example, when the antenna element 110 in the patch antenna layer 150 is capacitively (or parasitically) coupled.

As further shown in FIG. 1B, the shielding via 114 is before backdrilling (e.g., extending from the layer 140 to the top layer 149) while the shielding via 116 is after backdrilling (e.g., where the stub from the layer 140 to about the layer 146 is removed).

Because shielding vias (e.g., the shielding vias 114 and 116) are added to surround excitation vias so that the excitation vias can be isolated from other excitation signals, antenna elements (e.g., the antenna elements 110) can have perforations at random locations. The perforations can degrade the performance (e.g., radiation performance) of the antenna elements. FIGS. 2, 3A-3B, and 4-6 illustrate various antenna structure configurations that can improve the performance or recover the performance loss due to the accommodation of shielding vias.

Figure 2:
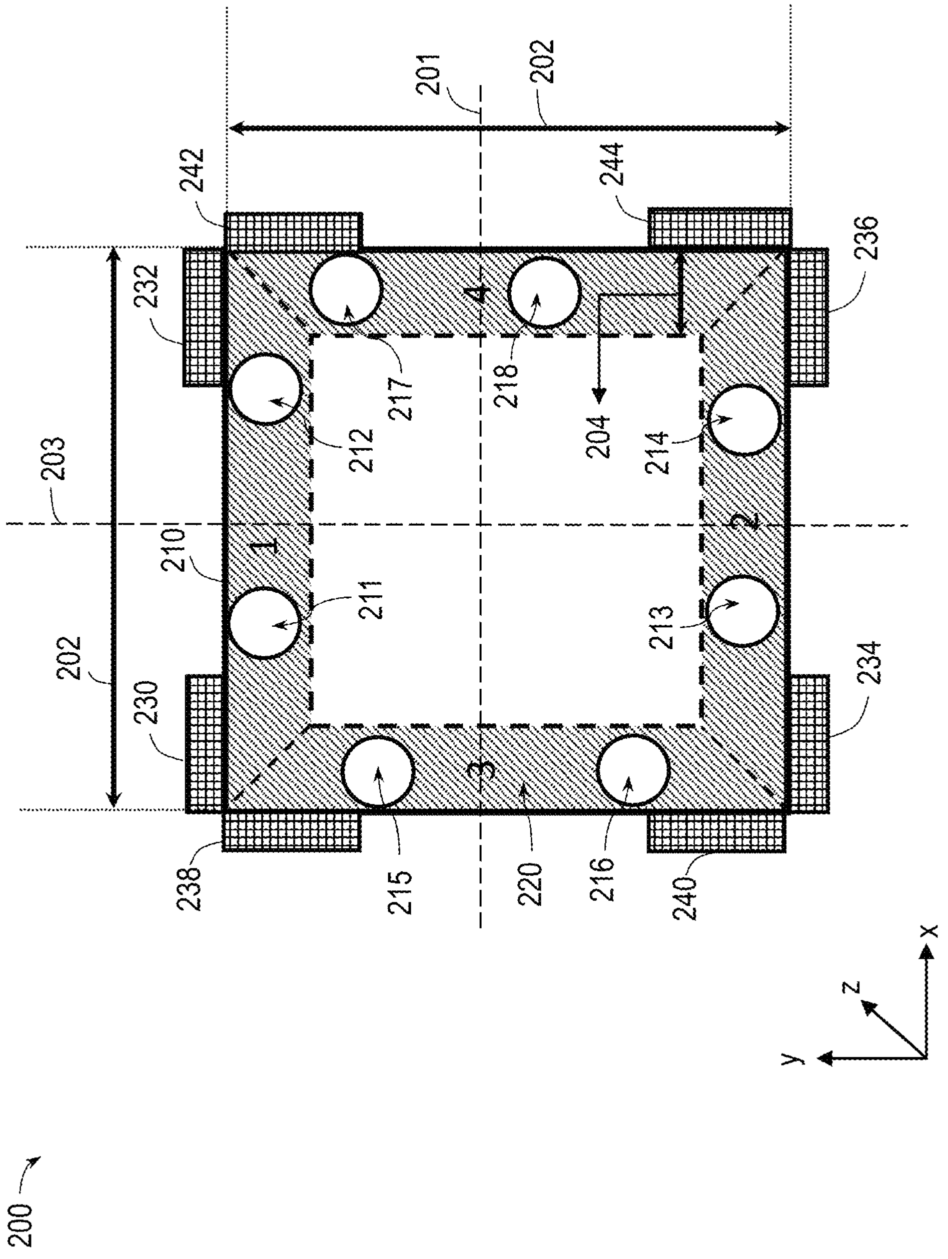
FIG. 2 illustrates a top view of an exemplary patch antenna with perforations and extended conductive portions, according to some embodiments of the disclosure.

FIG. 2 illustrates a top view of an exemplary patch antenna 200 with perforations and extended conductive portions, according to some embodiments of the disclosure. The top view may be in an y-x plane of the x-y-z coordinate system shown in FIG. 2. In some aspects, the patch antenna 200 may be used as an antenna element in an antenna array (e.g., the antenna array 101 of FIG. 1 or the antenna array 710 of FIG. 7). The patch antenna 200 may be a conductive patch (e.g., a radiating element). In some examples, the patch antenna 200 may be disposed on a layer of a multi-layered PCB system as described above with reference to FIG. 1B.

As shown in FIG. 2, the patch antenna 200 may have a substantially square shape 210 with perforations 211, 212, 213, 214, 215, 216, 217, and 218 located in a periphery 220 (e.g., regions near edges or an outer perimeter) of the patch antenna 200. More specifically, the perforations 211 and 212 may be on a first side (shown by region 1) of the patch antenna 200, the perforations 213 and 214 may be on a second side (shown by region 2) of the patch antenna 200 opposite the first side, the perforations 215 and 216 may be on a third side (shown by region 3) of the patch antenna 200 between the first and second sides, and the perforations 217 and 218 may be on a fourth side (shown by region 4) of the patch antenna 200 opposite the third side. In an example, the perforations 211-218 may be created to accommodate for shielding vias (e.g., the shielding vias 114 and 116) as discussed above. The perforations 211-218 may also be generally referred to as openings, slots, or removed portions.

As further shown in FIG. 2, the patch antenna 200 may have a side length 202 that is about half of a guided wavelength (e.g., Xg). The current distribution over the patch antenna 200 may be maximum at the edges of the patch antenna 200, for example, within a width 204 of approximately one tenth of the guided wavelength. As such, any perforations within these edge regions (shown by the pattern with the angled lines) can significantly degrade the performance (e.g., radiation pattern and/or signal strength) of the patch antenna 200.

To compensate for the perforations 211-218, the patch antenna 200 may include extended conductive portions 230, 232, 234, 236, 238, 240, 242, and 244. Each of the extended conductive portions 230-244 may compensate one of the perforations 211-218. That is, each of the perforations 211-218 may have a corresponding one of the extended conductive portions 230-244. More specifically, each extended conductive portion 230-244 may be symmetrically added to the patch antenna 200. For instance, the extended conductive portion 234 along the second side may be added to compensate the perforation 211 in region 1, the extended conductive portion 236 along the second side may be added to compensate the perforation 212 in region 1, the extended conductive portion 230 along the first side may be added to compensate the perforation 213 in region 2, and the extended conductive portion 232 along the first side may be added to compensate the perforation 214 in region 2. That is, a location of an individual perforation (e.g., the perforation 211) may be about symmetrical to a location of a corresponding one of the extended conductive portions (e.g., the extended conductive portion 234) at a center axis 201 of the patch antenna. The center axis 201 may extend from the third side to the opposing fourth side of the patch antenna 200.

In a similar way, the extended conductive portion 242 along the fourth side may be added to compensate the perforation 215 in region 3, the extended conductive portion 244 along the fourth side may be added to compensate the perforation 216 in region 3, the extended conductive portion 238 along the third side may be added to compensate the perforation 217 in region 4, and the extended conductive portion 240 along the third side may be added to compensate the perforation 218 in region 4. That is, a location of an individual perforation (e.g., the perforation 211) may be about symmetrical to a location of a corresponding one of the extended conductive portions (e.g., the extended conductive portion 234) at a center axis 203 of the patch antenna. The center axis 203 may extend from the first side to the opposing second side of the patch antenna 200. That is, the center axis 203 may be about perpendicular to the center axis 201. The extended conductive portions 230-244 may also be generally referred to as added conductive portions, augmentations, and/or extensions and may include the same electrically conductive material as the rest of the patch antenna 200 (e.g., the original square-shaped portion).

In some aspects, it may be desirable for an extended conductive portion to have about the same area as a perforation for which the extended conductive portion is to compensate. That is, the extended conductive portion 234 may have about the same area as the perforation 211, the extended conductive portion 236 may have about the same area as the perforation 212, and so on.

While FIG. 2 illustrates the perforations 211-218 having substantially circular shapes and the extended conductive portions 230-244 having substantially rectangular shapes, the perforations 211-218 and the extended conductive portions 230-244 can have any suitable combination of shapes (e.g., squares, circles, rectangles, irregular geometric shapes, etc.). Further, each of the perforations 211-218 and a corresponding one of the extended conductive portions 230-244 can have the same shape or different shapes.

In some examples, the extended conductive portions 230-244 of the patch antenna 200 can shift the resonance frequency and/or modify the operational bandwidth of the patch antenna 200 from the desired resonance frequency and/or the operational bandwidth (e.g., provided by the original square shape patch). In various aspects, the resonance frequency and/or the operational bandwidth may be restored to the desired ones (as designed for the square-shaped patch antenna) by adding another conductive patch vertically below the patch antenna 200 as will be discussed more fully below with reference to FIGS. 3A-3B, 4 and 6.

Figure 3A:
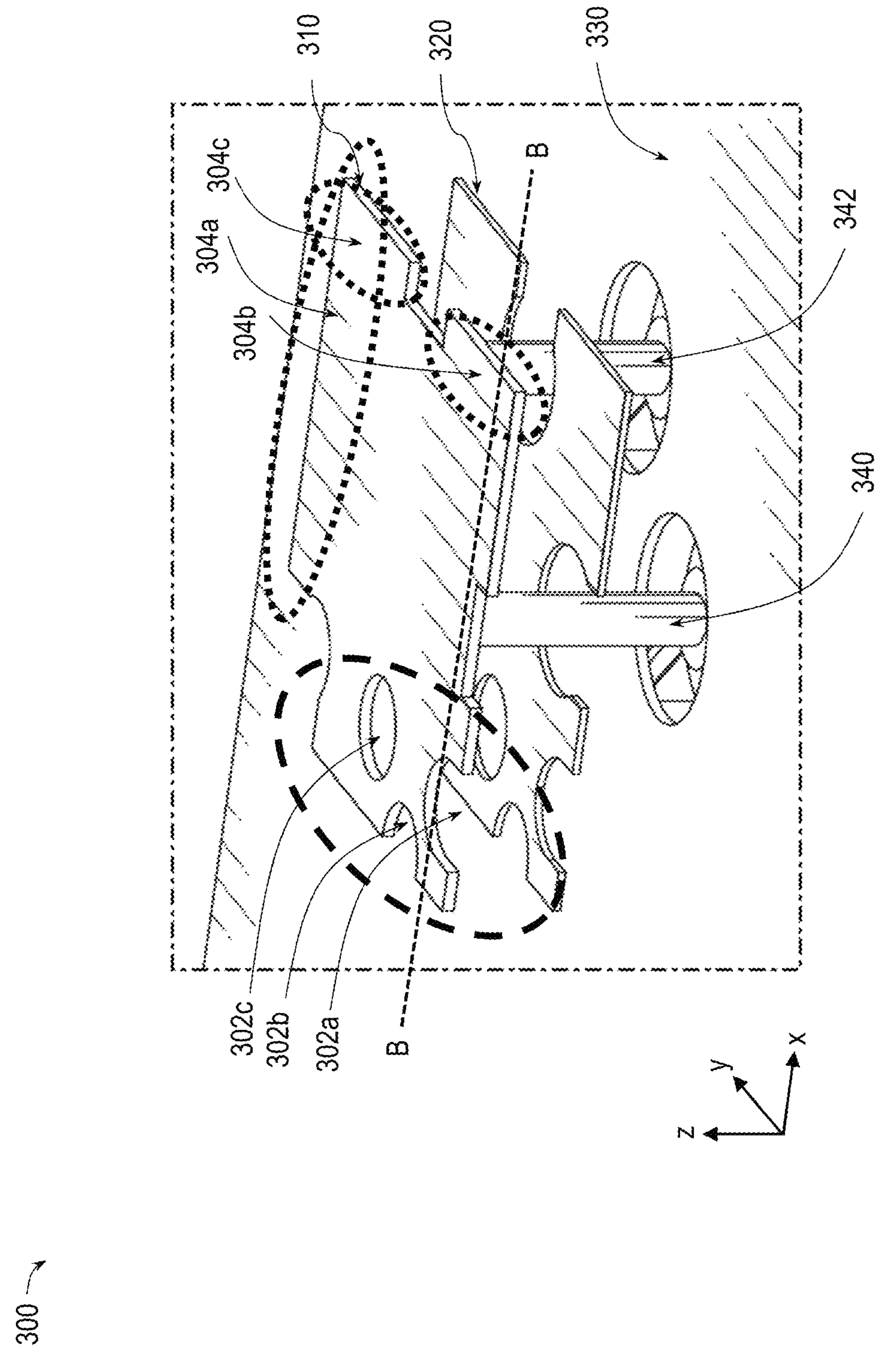
FIG. 3A illustrates a perspective view of an exemplary patch antenna structure with perforations and extended conductive portions, according to some embodiments of the disclosure.
Figure 3B:
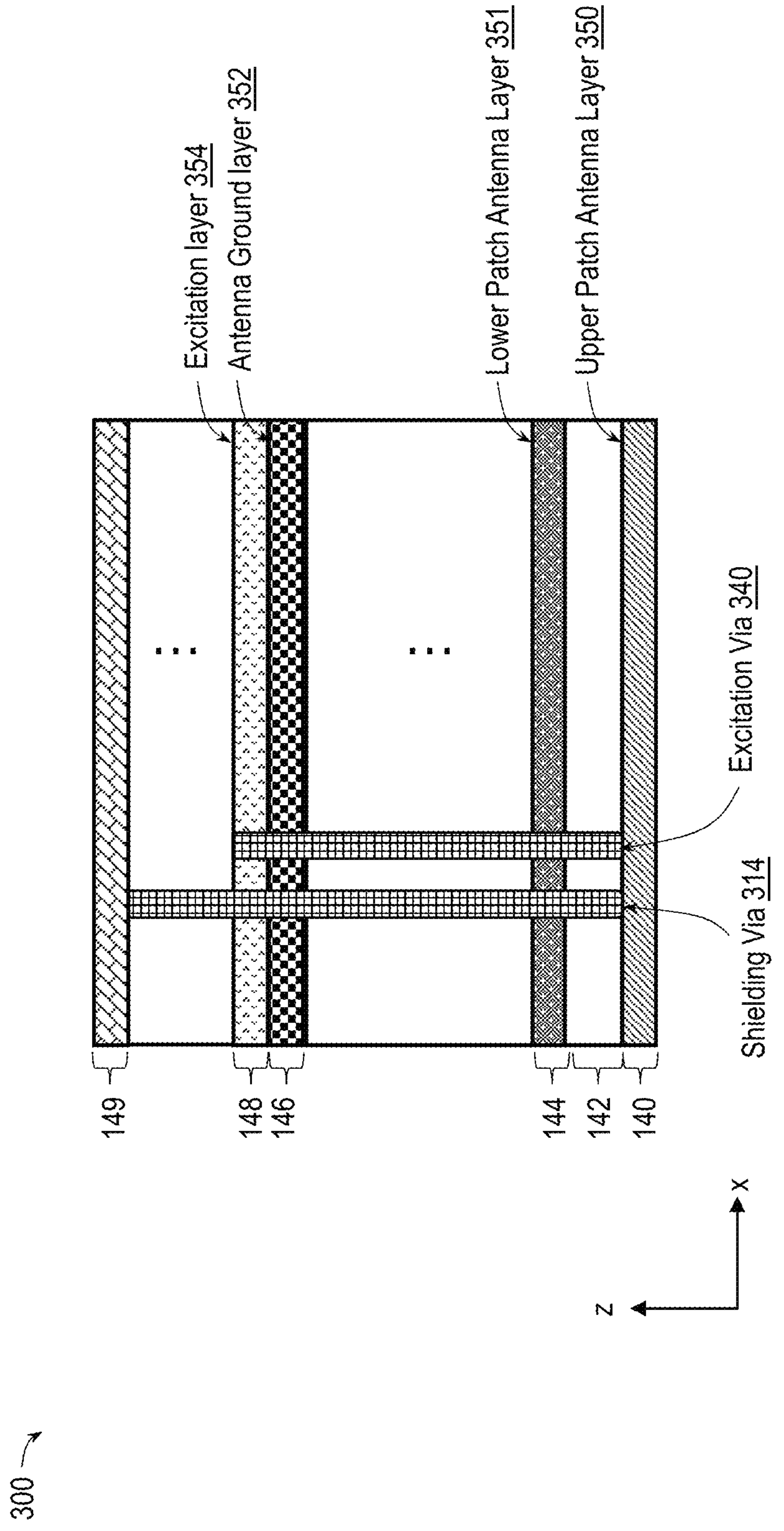
FIG. 3B illustrates a cross-sectional side view of an exemplary patch antenna structure with perforations and extended conductive portions, according to some embodiments of the disclosure.

FIG. 3A illustrates a perspective view of an exemplary patch antenna structure 300 with perforations and extended conductive portions, according to some embodiments of the disclosure. The perspective view may in an x-y-z coordinate system as shown in FIG. 3A. In some aspects, the patch antenna structure 300 may be used as an antenna element in an antenna array (e.g., the antenna array 101 of FIG. 1 or the antenna array 710 of FIG. 7). As shown in FIG. 3A, the patch antenna structure 300 may include an upper conductive patch 310 (e.g., a first conductive patch), a lower conductive patch 320 (e.g., a second conductive patch), and a ground plane 330. The patch antenna structure 300 may be a multi-layered PCB system (e.g., similar to the system 100 shown in FIG. 1B), where the upper conductive patch 310, the lower conductive patch 320, and the ground plane may be arranged on different layers of the structure 300. A more detailed view of the multi-layered system is shown in FIG. 3B and discussed more fully below with reference to FIG. 3B.

As further shown in FIG. 3A, the upper conductive patch 310 may include perforations 302 (individually shown as 302*a*, 302*b*, and 302*c* in an area shown by the dashed oval) near edge(s) of the upper conductive patch 310 and extended conductive portions 304 (in an area shown by the dashed ovals 303 and 305) near other edge(s) of the upper conductive patch 310. The perforations 302 may allow for room to accommodate shielding vias (e.g., the shielding vias 114 and 116). The extended conductive portions 304 (individually shown as 304*a*, 304*b*, 304*c* in an area shown by the dotted ovals) may compensate for the perforations 302. The perforations 302 and the extended conductive portions 304 may be substantially similar to the perforations 211-218 and the extended conductive portions 230-244 at the patch antenna 200 discussed above with reference to FIG. 2. In general, each perforation 302 may have a corresponding extended conductive portion 304 to compensate for the radiation pattern change caused by the perforation 302. For instance, the extended conductive portion 304*a* may compensate for the perforation 302*a*, the extended conductive portion 304*b* may compensate for the perforation 302*b*, and the extended conductive portion 304*c* may compensate for the perforation 302*c*.

The lower conductive patch 320 may be spaced apart from the upper conductive patch 310 (e.g., by a dielectric material). The lower conductive patch 320 may be used to tune or adjust the dielectric constant as seen by the upper conductive patch 310. In some examples, the lower conductive patch 320 may be a non-radiating patch or element. The lower conductive patch 320 may have any suitable shape and may generally have notches or cut-outs aligned to the perforations 302 to accommodate for the shielding vias.

In various aspects, the patch antenna structure 300 may support dual polarization. As shown in FIG. 3A, the patch antenna structure 300 may include a first signal feed 340 (e.g., an excitation via or a vertical electrical conductor) and a second signal feed 342. The first signal feed 340 may be for a first polarization and the second signal feed 342 may be for a second polarization different from the first polarization. For instance, the first polarization may be an H-pol and the second polarization may be a V-pol. Alternatively, the first polarization may be a V-pol and the second polarization may be an H-pol. Further, in the structure 300, the first signal feed 340 and the second signal feed 342 may be capacitively (parasitically) coupled to the lower conductive patch 320. That is, the first signal feed 340 and the second signal feed 342 may not be in direct contact with the lower conductive patch 320.

FIG. 3B illustrates a cross-sectional side view of the exemplary patch antenna structure 300 of FIG. 3A, according to some embodiments of the disclosure. The cross-sectional side view may be taken along the line B-B of FIG. 3A. The cross-sectional side view may be in an z-x plane of the x-y-z coordinate system of FIGS. 3A-3B. As shown in FIG. 3B, the structure 300 may be a multi-layered PCB system including conductive layers alternating with insulating or dielectric layers vertically along the z-axis similar to the system 100 shown in FIG. 1B. For simplicity, the same reference numerals are used to refer to the same PCB layers as in FIG. 1B. In the example shown in FIG. 3B, the layer 140 may be an upper patch antenna layer 350 on which the upper conductive patch 310 of FIG. 3A may be disposed, the layer 144 may be a lower patch antenna layer 351 on which the lower conductive patch 320 of FIG. 3A may be disposed, and the layer 146 may be an antenna ground layer 352 on which the ground plane 330 of FIG. 3A may be disposed. The layer 148 may be an excitation layer 354 on which excitation lines (e.g., from BFIC(s) such as the BFIC 120 and/or or 122) may be disposed. The first signal feed 340 (e.g., excitation via) may extend between the upper patch antenna layer 350 and the excitation layer 354. For instance, the first signal feed 340 may have one end (e.g., a first end) electrically coupled to the upper patch antenna layer 350 and an opposing end (e.g., a second end) electrically coupled to the excitation layer 354.

FIG. 3B further shows a shielding via 314 before back-drilling (e.g., extending from the layer 140 to the top layer 149). In an example, the shielding via may correspond to the perforations 302*a*. The shielding via 314 may be proximate to the first signal feed 340. In general, the structure 300 can include any suitable number of shielding vias arranged in any suitable locations to isolate the first signal feed 340 and/or the second signal feed 342 from each other and/or signals from other signal feeds for neighboring antenna elements in the same antenna array.

Figure 4:
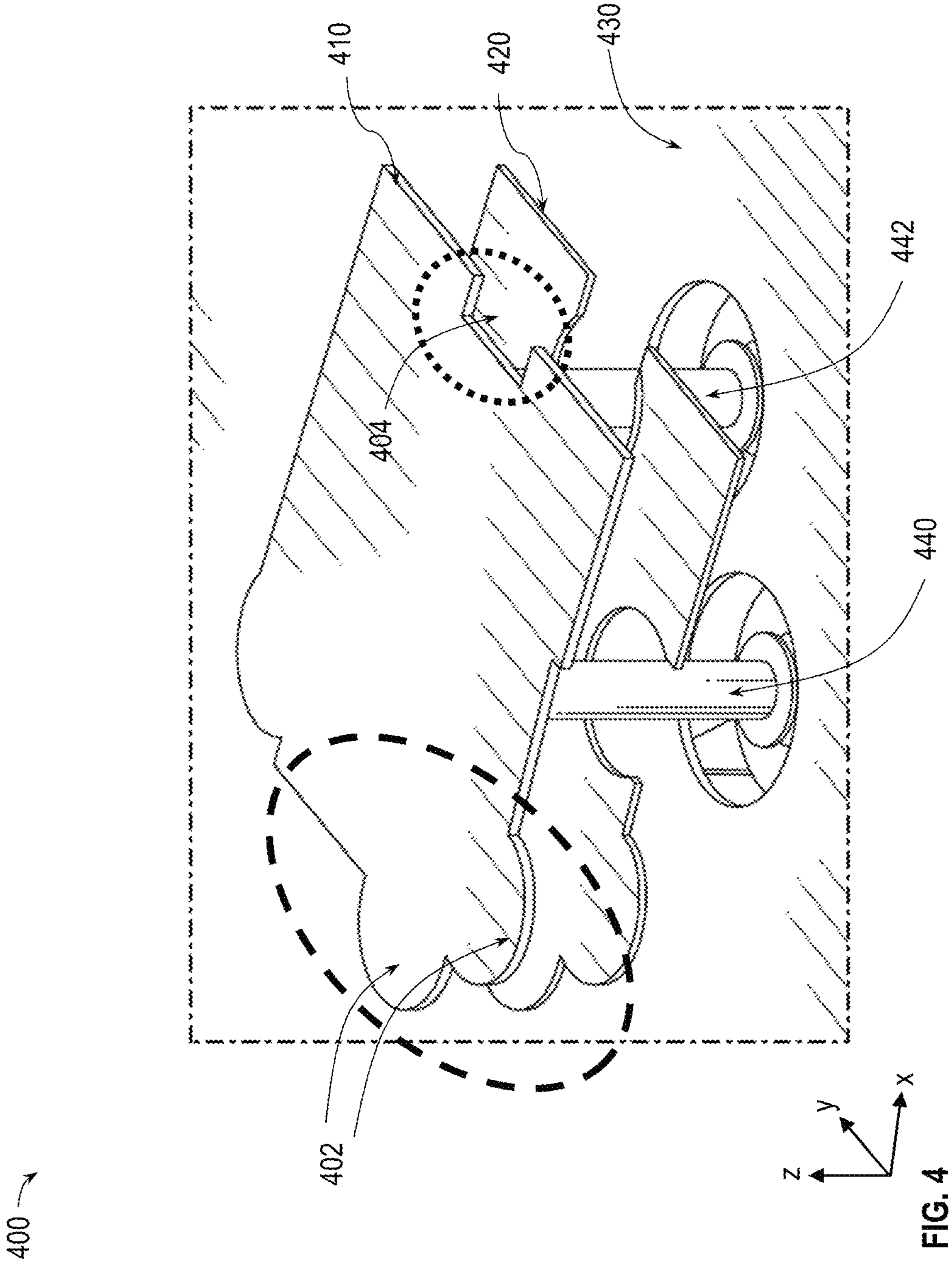
FIG. 4 illustrates a perspective view of an exemplary patch antenna structure with plated holes and cut-out regions, according to some embodiments of the disclosure.

FIG. 4 illustrates a perspective view of an exemplary patch antenna structure 400 with plated holes and cut-out regions, according to some embodiments of the disclosure. The perspective view may in an x-y-z coordinate system as shown in FIG. 4. In some aspects, the patch antenna structure 400 may be used as an antenna element in an antenna array (e.g., the antenna array 101 of FIG. 1 or the antenna array 710 of FIG. 7). As shown in FIG. 4, the patch antenna structure 400 may include an upper conductive patch 410 (e.g., a first conductive patch), a lower conductive patch 420 (e.g., a second conductive patch), and a ground plane 430. The patch antenna structure 400 may be a multi-layered PCB system (e.g., similar to the system 100 shown in FIG. 1B and the structure 300 shown in FIG. 3B), where the upper conductive patch 410, the lower conductive patch 420, and the ground plane may be arranged on different layers of the structure 400.

In FIG. 4, the upper conductive patch 410 may include plated holes 402 (in an area shown by the dashed oval) near edge(s) of the upper conductive patch 410 and cut-out regions 404 (in an area shown by the dashed ovals) near other edge(s) of the upper conductive patch 410. The plated holes 402 may be perforations similar to the perforations 302 but with epoxy-filling and plating (e.g., an electrically conducive material) to cover the epoxy-filled perforations. The plated holes 402 may be used to accommodate shielding vias (e.g., the shielding vias 114 and 116) similar to the perforations 302 of the structure 300. Because of the plating, the area around the plating may be augmented. That is, the upper conductive patch 410 may have an increase conductive area at the respective edge(s). The cut-out regions 404 may compensate for the augmentations caused by the plated holes 402.

In general, each plated hole 402 may have a corresponding cut-out region 404 to compensate for the radiation pattern change caused by the plated hole 402. In an example, each cut-out region 404 may be about symmetric to a corresponding plated hole 402 similar to the correspondence between the perforations 211-218 and the extended conductive portions 230-244 discussed above with reference to FIG. 2. In general, a location of a first cut-out region on a first side of the upper conductive patch 410 may be about symmetrical to a location of a corresponding plated hole on an opposing second side of the upper conductive patch 410 at a center axis of the upper conductive patch 410. The center axis may extend from a third side to an opposing fourth side of the upper conductive patch 410, where the third side may be adjacent to the first and second sides. In some examples, an area of a cut-out region 404 may be about the same as an area of a corresponding plated hole 402. The cut-out region 404 may generally be referred to as an opening, a slot, or a removed portion.

Similar to the structure 300, the lower conductive patch 420 in the structure 400 may be spaced apart from the upper conductive patch 410 (e.g., by a dielectric material). The lower conductive patch 420 may be used to tune or adjust the dielectric constant as seen by the upper conductive patch 410. In some examples, the lower conductive patch 420 may be a non-radiating element. The lower conductive patch 420 may have any suitable shape and may generally have augmentations aligned to the plated holes of the upper conductive patch 410 to accommodate for the shielding vias.

Further, similar to the structure 300, the patch antenna structure 400 may support dual polarization. As shown in FIG. 4, the patch antenna structure 400 may include a first signal feed 440 (e.g., an excitation via or a vertical electrical conductor) and a second signal feed 442. The first signal feed 440 may be for a first polarization and the second signal feed 442 may be for a second polarization different from the first polarization. For instance, the first polarization may be an H-pol and the second polarization may be a V-pol. Alternatively, the first polarization may be a V-pol and the second polarization may be an H-pol. Further, in the structure 400, the first signal feed 440 and the second signal feed 442 may be capacitively (parasitically) coupled to the lower conductive patch 420. That is, the first signal feed 440 and the second signal feed 442 may not be in direct contact with the lower conductive patch 420.

Figure 5:
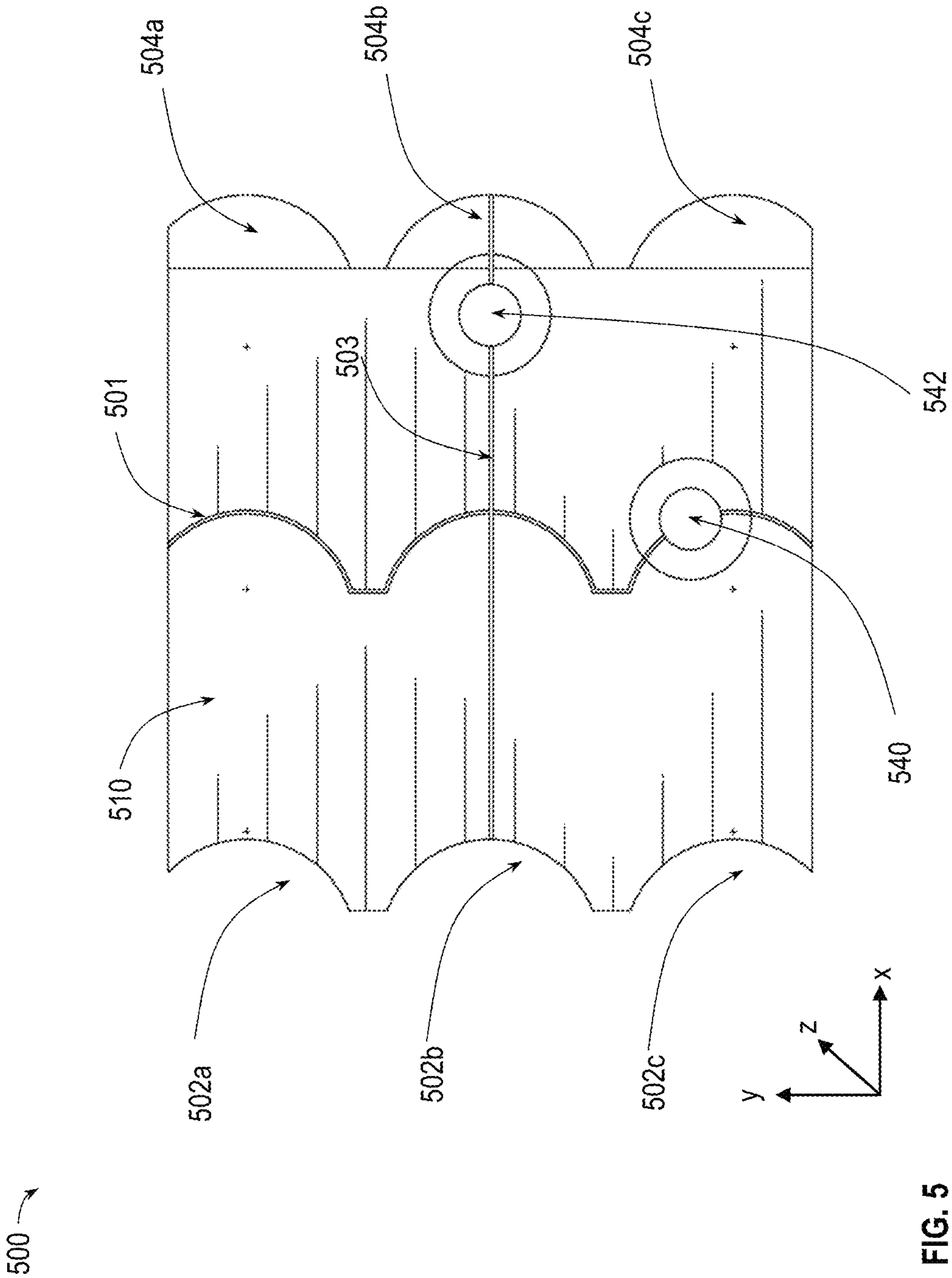
FIG. 5 illustrates a top view of an exemplary patch antenna structure with perforations and extended conductive portions, according to some embodiments of the disclosure.

FIG. 5 illustrates a top view of an exemplary patch antenna structure 500 with perforations and extended conductive portions, according to some embodiments of the disclosure. The structure 500 may be a multi-layered PCB system as shown in FIG. 1B and FIG. 3B. The top view may be in an y-x plane of the x-y-z coordinate system shown in FIG. 5. In some aspects, the patch antenna structure 500 may be used as an antenna element in an antenna array (e.g., the antenna array 101 of FIG. 1 or the antenna array 710 of FIG. 7). The patch antenna structure 500 may include an upper conductive patch 510 (e.g., similar to the upper conductive patch 310 of FIG. 3 or the patch antenna 200 of FIG. 2). The conductive patch 510 may originally have a substantially squared shape. The conductive patch 510 may include perforations 502 (individually shown as 502*a*, 502*b*, 502*c*) to accommodate shielding vias (e.g., the shielding vias 114 and 116). To compensate for the performance loss caused by the perforations 502, the conductive patch 510 may include an extended conductive portion 504 (individually shown as 504*a*, 504*b*, 504*c*) for each perforation 502. More specifically, the extended conductive portion 504*a* may be added to compensate for the perforation 502*a*, the extended conductive portion 504*b* may be added to compensate for the perforation 502*b*, and so on. In general, a removed portion from one side (or edge) of the conductive patch 510 can be added back to an opposing side (or edge) of the conductive patch 510. In some examples, an area of an extended conductive portion 504 may be about the same as an area of a corresponding perforation 502.

In various embodiments, the patch antenna structure 500 may support dual polarization similar to the antenna structures 300 and 400. For instance, the structure 500 may further include a first signal feed 540 (e.g., an excitation via or a vertical electrical conductor) and a second signal feed 542. The first signal feed 540 may be for a first polarization and the second signal feed 542 may be for a second polarization different from the first polarization. As an example, the first polarization may be an H-pol and the second polarization may be a V-pol, where the short circuit line for V-pol may be shown by the line 501 and the short circuit line for the H-pol may be shown by the line 503.

Figure 6:
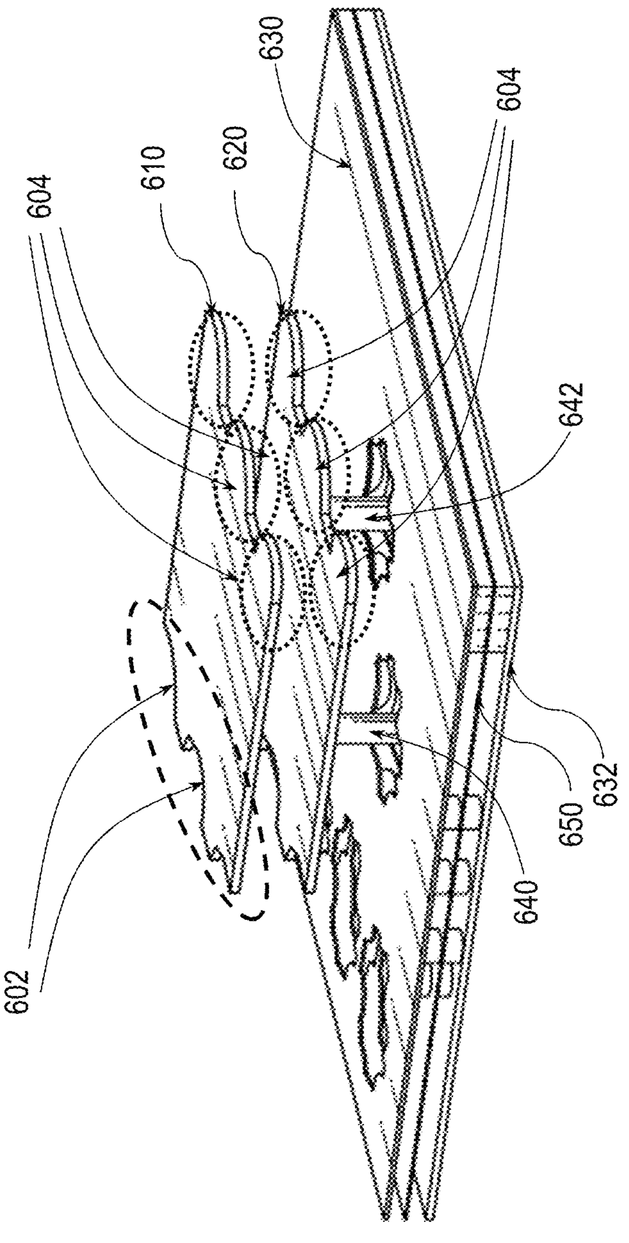
FIG. 6 illustrates a top view of an exemplary stacked patch antenna structure with perforations and extended conductive portions, according to some embodiments of the disclosure.

FIG. 6 illustrates a top view of an exemplary stacked patch antenna structure 600 with perforations and extended conductive portions, according to some embodiments of the disclosure. The perspective view may in an x-y-z coordinate system as shown in FIG. 6. In some aspects, the patch antenna structure 600 may be used as an antenna element in an antenna array (e.g., the antenna array 101 of FIG. 1 or the antenna array 710 of FIG. 7). As shown in FIG. 6, the patch antenna structure 600 may include an upper conductive patch 610 (e.g., a first conductive patch), a lower conductive patch 620 (e.g., a second conductive patch), and a ground plane 630. The patch antenna structure 600 may be a multi-layered PCB system (e.g., similar to the system 100 shown in FIG. 1B and the structure 300 shown in FIG. 3B), where the upper conductive patch 610, the lower conductive patch 620, and the ground plane may be arranged on different layers of the structure 600. Further, the upper conductive patch 610 and the lower conductive patch 620 may be substantially similar as the upper conductive patch 310 and the lower conductive patch 320 of FIG. 3, respectively, where the upper conductive patch 610 may include perforations 602 (in an area shown by the dashed oval) similar to the perforations 302, and the upper conductive patch 610 and the lower conductive patch 620 may include extended conductive portions 604 (in areas shown by the dotted ovals) similar to the extended conductive portion 304 to compensate the radiation loss due to the perforations 602. However, in the structure 600, a first signal feed 640 and a second signal feed 642 are electrically coupled (connected) to the lower conductive patch 620 and capacitively (parasitically) coupled to the upper conductive patch 610 and both the upper conductive patch 610 and the lower conductive patch 620 are radiating patches or elements. this, the structure 600 may be referred to as a stacked antenna structure. Further, the structure 600 may support dual polarization, where the first signal feed 640 may be for a first polarization and the second signal feed 642 may be for a second polarization different from (orthogonal to) the first polarization. For instance, the first polarization may be one of an H-pol or V-pol, and the second polarization may be the other one of the H-pol or V-pol.

As further shown in FIG. 6, the structure 600 may include an excitation layer 650 between the ground plane 630 and another ground plane 632. The excitation layer 650 may include excitation striplines coupled to beamformers (e.g., the BFICs 120 and 122 of FIG. 1 or the beamformer array 720 of FIG. 7).

In general, an antenna structure may that allow for shielding vias may include any suitable combinations of perforations (e.g., where drills may be left as air holes), extended conductive portions, plated holes (e.g., where drills may be filled with an epoxy material (conductive or non-conductive epoxy material) and plated-over), and/or cut-out regions.

That is, an antenna structure can utilize any suitable combination of configurations as discussed above with reference to FIGS. 2, 3A-3B, and 4-6.

Figure 7:
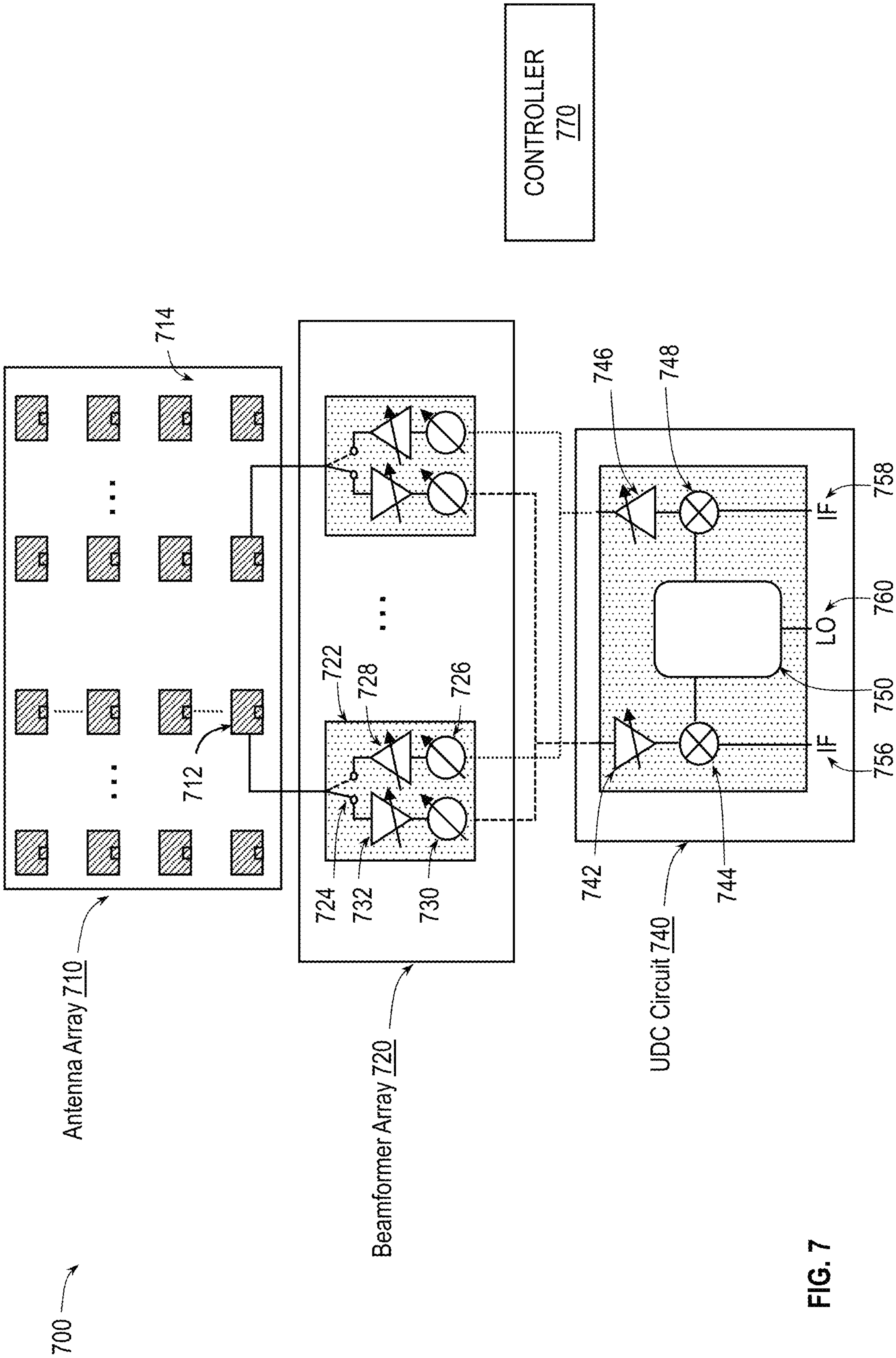
FIG. 7 is a block diagram illustrating an antenna array apparatus, according to some embodiments of the disclosure.

FIG. 7 is a block diagram illustrating an antenna array apparatus 700, in which antenna elements with perforations and augmentations as discussed herein may be used for transmission/reception, according to some embodiments of the disclosure. As shown in FIG. 7, the antenna apparatus 700 may include an antenna array 710, a beamformer array 720, a UDC circuit 740, and a controller 770.

In general, the antenna array 710 may include a plurality of antenna elements 712 (only one of which is labeled with a reference numeral in FIG. 7 in order to not clutter the drawing), housed in (e.g., in or over) a substrate 714, where the substrate 714 may be, e.g., a PCB or any other support structure. In various embodiments, the antenna elements 712 may be radiating elements or passive elements. For example, the antenna elements 712 may include dipoles, open-ended waveguides, slotted waveguides, microstrip antennas, and the like. In some embodiments, the antenna elements 712 may include any suitable elements configured to wirelessly transmit and/or receive RF signals. The antenna array 710 may be a phased array antenna and, therefore, will be referred to as such in the following. In some embodiments, the phased array antenna 710 may be a printed phased array antenna. In some embodiments, the antenna array 710 may be similar to the antenna array 101 of FIG. 1.

At least some of the antenna elements 712 may be implemented using a first conductive patch or patch antenna (e.g., the patch antenna 200, or the upper conductive patches 310, 410, 510, 610). In some examples, the first conductive patch can include perforations and corresponding extended conductive portions similar to the patch antenna 200, the upper conductive patch 310, 510, or 610 as discussed above. In other examples, the first conductive patch can include plated holes and corresponding cut-out regions similar to the upper conductive patch 410 discussed above. In some embodiments, the at least some antenna elements 712 may include a second conductive patch (e.g., the lower conductive patches 320, 420, 620) for tuning and/or adjusting the resonance frequency and/or operational bandwidth as discussed herein.

Further details shown in FIG. 7, such as the particular arrangement of the beamformer array 720, of the UDC circuit 740, and the relation between the beamformer array 720 and the UDC circuit 740 may be different in different embodiments, with the description of FIG. 7 providing only some examples of how these components may be used together with the phased array antenna 710 including antenna elements 712 configured, for example, using the antenna structures 300, 400, 500, and/or 600. Furthermore, although some embodiments shown in the present drawings illustrate a certain number of components (e.g., a certain number of antenna elements 712, beamformers, and/or UDC circuits), it is appreciated that these embodiments may be implemented with any number of these components in accordance with the descriptions provided herein. Furthermore, although the disclosure may discuss certain embodiments with reference to certain types of components of an antenna apparatus (e.g., referring to a substrate that houses antenna element as a PCB although in general it may be any suitable support structure), it is understood that the embodiments disclosed herein may be implemented with different types of components.

The beamformer array 720 may include a plurality of beamformers 722 (only one of which is labeled with a reference numeral in FIG. 7 in order to not clutter the drawing). The beamformers 722 may be seen as transceivers (e.g., devices which may transmit and/or receive signals, in this case—RF signals) that feed to antenna elements 712. In some embodiments, a single beamformer 722 may be associated with (i.e., exchange signals with, e.g., feed signals to) one of the antenna elements 712 (e.g., in a one-to-one correspondence). In other embodiments, multiple beamformers 722 may be associated with a single antenna element 712. Yet in other embodiments, a single beamformer 722 may be associated with a plurality of antenna elements 712. In some embodiments, the beamformers 722 may correspond to the beamformer channels 121 in the BFICs 120 and/or 122 discussed above. In some embodiments, each beamformer channel 121 may be coupled or fed to an antenna element 712. When the antenna element 712 includes two conductive patches as discussed herein, the beamformer channel 121 may be fed using an excitation via that is electrically coupled to one of the two conductive patches and capacitively coupled to the other one of the two conductive patches.

In some embodiments, each of the beamformers 722 may include a switch 724 to switch the path from the corresponding antenna element 712 to the receiver or the transmitter path. Although not specifically shown in FIG. 7, in some embodiments, each of the beamformers 722 may also include another switch to switch the path from a signal processor (also not shown) to the receiver or the transmitter path. As shown in FIG. 7, in some embodiments, the transmit path (TX path) of each of the beamformers 722 may include a phase shifter 726 and a variable (e.g., programmable) gain amplifier 728, while the receive path (RX path) may include a phase shifter 730 and a variable (e.g., programmable) gain amplifier 732. The phase shifter 726 may be configured to adjust the phase of the RF signal to be transmitted (TX signal) by the antenna element 712 and the variable gain amplifier 728 may be configured to adjust the amplitude of the TX signal to be transmitted by the antenna element 712. Similarly, the phase shifter 730 and the variable gain amplifier 732 may be configured to adjust the RF signal received (RX signal) by the antenna element 712 before providing the RX signal to further circuitry, e.g., to the UDC circuit 740, to the signal processor (not shown), etc. The beamformers 722 may be considered to be "in the RF path" of the antenna apparatus 700 because the signals traversing the beamformers 722 are RF signals (i.e., TX signals which may traverse the beamformers 722 are RF signals upconverted by the UDC circuit 740 from lower frequency signals, e.g., from intermediate frequency (IF) signals or from baseband signals, while RX signals which may traverse the beamformers 722 are RF signals which have not yet been downconverted by the UDC circuit 740 to lower frequency signals, e.g., to IF signals or to baseband signals).

Although a switch is shown in FIG. 7 to switch from the transmitter path to the receive path (i.e., the switch 724), in other embodiments of the beamformer 722, other components can be used, such as a duplexer. Furthermore, although FIG. 7 illustrates an embodiment where the beamformers 722 include the phase shifters 726, 730 (which may also be referred to as "phase adjusters") and the variable gain amplifiers 728, 732, in other embodiments, any of the beamformers 722 may include other components to adjust the magnitude and/or the phase of the TX and/or RX signals. In some embodiments, one or more of the beamformers 722 may not include the phase shifter 726 and/or the phase shifter 730 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 722.

Turning to the details of the UDC, in general, the UDC circuit 740 may include an upconverter and/or downconverter circuitry, i.e., in various embodiments, the UDC circuit 740 may include 7) an upconverter circuit but no downconverter circuit, 2) a downconverter circuit but no upconverter circuit, or 3) both an upconverter circuit and a downconverter circuit. As shown in FIG. 7, in some embodiments, the downconverter circuit of the UDC circuit 740 may include an amplifier 742 and a mixer 744, while the upconverter circuit of the UDC circuit 740 may include an amplifier 746 and a mixer 748. In some embodiments, the UDC circuit 740 may further include a phase shift module 750.

In various embodiments, the term "UDC circuit" may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 740 only includes circuit elements related to the TX path (e.g., only an upconversion mixer but not a downconversion mixer; in such implementations the UDC circuit may be used as/in an RF transmitter for generating RF signals for transmission), implementations where the UDC circuit 740 only includes circuit elements related to the RX path (e.g., only an downconversion mixer but not an upconversion mixer; in such implementations the UDC circuit 740 may be used as/in an RF receiver to downconvert received RF signals, e.g., the UDC circuit 740 may enable an antenna element of the phased array antenna 710 to act, or be used, as a receiver), as well as implementations where the UDC circuit 740 includes, both, circuit elements of the TX path and circuit elements of the RX path (e.g., both the upconversion mixer and the downconversion mixer; in such implementations the UDC circuit 740 may be used as/in an RF transceiver, e.g., the UDC circuit 740 may enable an antenna element of the phased array antenna 710 to act, or be used, as a transceiver).

Although a single UDC circuit 740 is illustrated in FIG. 7, multiple UDC circuits 740 may be included in the antenna apparatus 700 to provide upconverted RF signals to and/or receive RF signals to be downconverted from any one of the beamformers 722. Each UDC circuit 740 may be associated with a plurality of beamformers 722 of the beamformer array 720, e.g., using a splitter/combiner. This is schematically illustrated in FIG. 7 with dashed lines and dotted lines within the splitter/combiner connecting various elements of the beamformer array 720 and the UDC circuit 740. Namely, FIG. 7 illustrates that the dashed lines connect the downconverter circuit of the UDC circuit 740 (namely, the amplifier 742) to the RX paths of two different beamformers 722, and that the dotted lines connect the upconverter circuit of the UDC circuit 740 (namely, the amplifier 746) to the TX paths of two different beamformers 722. For example, there may be 96 beamformers 722 in the beamformer array 720, associated with 96 antenna elements 712 of the phased array antenna 710.

In some embodiments, the mixer 744 in the downconverter path (i.e., RX path) of the UDC circuit 740 may have at least two inputs and one output. One of the inputs of the mixer 744 may include an input from the amplifier 742, which may, e.g., be a low-noise amplifier (LNA). The second input of the mixer 744 may include an input indicative of the LO signal 760. In some embodiments, phase shifting may be implemented in the LO path (additionally or alternatively to the phase shifting in the RF path), in which case the LO signal 760 may be provided, first, to a phase shift module 750, and then a phase-shifted LO signal 760 is provided as the second input to the mixer 744. In the embodiments where phase shifting in the LO path is not implemented, the phase shift module 750 may be absent and the second input of the mixer 744 may be configured to receive the LO signal 760. The one output of the mixer 744 is an output to provide the downconverted signal 756, which may, e.g., be an IF signal 756. The mixer 744 may be configured to receive an RF RX signal from the RX path of one of the beamformers 722, after it has been amplified by the amplifier 742, at its first input and receive either a signal from the phase shift module 750 or the LO signal 760 itself at its second input, and mix these two signals to downconvert the RF RX signal to an lower frequency, producing the downconverted RX signal 756, e.g., the RX signal at the IF. Thus, the mixer 744 in the downconverter path of the UDC circuit 740 may be referred to as a "downconverting mixer."

In some embodiments, the mixer 748 in the upconverter path (i.e., TX path) of the UDC circuit 740 may have [at least] two inputs and one output. The first input of the mixer 748 may be an input for receiving a TX signal 758 of a lower frequency, e.g., the TX signal at IF. The second input of the mixer 748 may include an input indicative of the LO signal 760. In the embodiments where phase shifting is implemented in the LO path (either additionally or alternatively to the phase shifting in the RF path), the LO signal 760 may be provided, first, to a phase shift module 750, and then a phase-shifted LO signal 760 is provided as the second input to the mixer 748. In the embodiments where phase shifting in the LO path is not implemented, the phase shift module 750 may be absent and the second input of the mixer 748 may be configured to receive the LO signal 760. The one output of the mixer 748 is an output to the amplifier 746, which may, e.g., be a power amplifier (PA). The mixer 748 may be configured to receive an IF TX signal 758 (i.e., the lower frequency, e.g. IF, signal to be transmitted) at its first input and receive either a signal from the phase shift module 750 or the LO signal 760 itself at its second input, and mix these two signals to upconvert the IF TX signal to the desired RF frequency, producing the upconverted RF TX signal to be provided, after it has been amplified by the amplifier 746, to the TX path of one of the beamformers 722. Thus, the mixer 748 in the upconverter path of the UDC circuit 740 may be referred to as a "upconverting mixer."

In some embodiments, the amplifier 728 may be a PA and/or the amplifier 732 may be an LNA.

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 756 and 758 as IF signals, these descriptions are equally applicable to embodiments where signals 756 and 758 are baseband signals. In such embodiments, frequency mixing of the mixers 744 and 748 may be a zero-IF mixing (also referred to as a "zero-IF conversion") in which the LO signal 760 used to perform the mixing may have a center frequency in the band of RF RX/TX frequencies.

Although not specifically shown in FIG. 7, in further embodiments, the UDC circuit 740 may further include a balancer, e.g., in each of the TX and RX paths, configured to mitigate imbalances in the in-phase and quadrature (IQ) signals due to mismatching. Furthermore, although also not specifically shown in FIG. 7, in other embodiments, the antenna apparatus 700 may include further instances of a combination of the phased array antenna 710, the beamformer array 720, and the UDC circuit 740 as described herein.

The controller 770 may include any suitable device, configured to control operation of various parts of the antenna apparatus 700. For example, in some embodiments, the controller 770 may control the amount and the timing of phase shifting implemented in the antenna apparatus 700. In another example, in some embodiments, the controller 770 may control various signals, as well as the timing of those signals, provided to the antenna elements 712 implemented using the patch antenna 200, the antenna structures 300, 400, 500, and/or 600 in the antenna array 710 to provide dual band operations and/or a wide scan range.

The antenna apparatus 700 can steer an electromagnetic radiation pattern of the phased array antenna 710 in a particular direction, thereby enabling the phased array antenna 710 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 700 can generate desired antenna patterns by providing phase shifter settings for the antenna elements 712, e.g., using the phase shifters of the beamformers 722 and/or the phase shift module 750.

The following paragraphs provide various examples of the embodiments disclosed herein.

Example 1 includes a patch antenna structure, including a first conductive patch on a first layer of the structure, where the first conductive patch includes one or more perforations at a periphery of a first side of the first conductive patch, and one or more extended conductive portions at a second side of the first conductive patch, the second side opposite the first side; a ground plane on a ground layer of the structure, the ground layer spaced apart from the first layer; and a first signal feed to couple a signal to the first conductive patch.

In Example 2, the patch antenna structure of example 1 can optionally include where each of the one or more perforations has a corresponding one of the one or more extended conductive portions.

In Example 3, the patch antenna structure of any examples 1-2 can optionally include where a location of a first perforation of the one or more perforations is symmetrical to a location of a corresponding one of the one or more extended conductive portions at a center axis of the first conductive patch, the center axis extending from a third side to a fourth side of the first conductive patch, the third side is opposite the fourth side and adjacent to the first and second sides.

In Example 4, the patch antenna structure of any examples 1-3 can optionally include where an area of a first extended conductive portion of the extended conductive portions is based on an area of a corresponding one of the one or more perforations.

In Example 5, the patch antenna structure of any examples 1-4 can optionally include where a first extended conductive portion of the extended conductive portions compensates a radiation pattern associated with a corresponding one of the one or more perforations.

In Example 6, the patch antenna structure of any examples 1-5 can optionally include a second conductive patch on a second layer of the structure, the second layer between the first layer and the ground layer and spaced apart from the first layer by a dielectric material.

In Example 7, the patch antenna structure of example 6 can optionally include where the first signal feed is electrically coupled to the first conductive patch and capacitively coupled to the second conductive patch.

In Example 8, the patch antenna structure of any examples 6-7 can optionally include where the first signal feed is electrically coupled to the second conductive patch and capacitively coupled to the first conductive patch.

In Example 9, the patch antenna structure of example 8 can optionally include where the first conductive patch and the second conductive patch are radiating elements.

In Example 10, the patch antenna structure of any examples 1-9 can optionally include a second signal feed to couple another signal to the first conductive patch, where the first signal feed is associated with a first polarization, and the second signal feed is associated with a second polarization different from the first polarization.

In Example 11, the patch antenna structure of any examples 1-10 can optionally include where a first perforation of the one or more perforations is for a shielding via and is proximate to the first signal feed.

Example 12 includes a patch antenna structure, including a first conductive patch on a first layer of the structure, where the first conductive patch includes one or more plated holes at a periphery of a first side of the first conductive patch, and one or more cut-out regions at a second side of the first conductive patch, the second side opposite the first side; a ground plane on a ground layer of the structure, the ground layer spaced apart from the first layer; and a first signal feed to couple a signal to the first conductive patch. The one or more plated holes may be filled with an epoxy material and plated over.

In Example 13, the patch antenna structure of example 12 can optionally include where each of the one or more plated holes has a corresponding one of the one or more cut-out regions.

In Example 14, the patch antenna structure of any examples 12-13 can optionally include where a location of a first cut-out region of the one or more cut-out regions is symmetrical to a location of a corresponding one of the one or more plated holes at a center axis of the first conductive patch, the center axis extending from a third side to a fourth side of the first conductive patch, the third side is opposite the fourth side and adjacent to the first and second sides.

In Example 15, the patch antenna structure of any examples 12-14 can optionally include where an area of a first cut-out region of the one or more cut-out regions is based on an area of a corresponding one of the one or more plated holes.

In Example 16, the patch antenna structure of any examples 12-15 can optionally include where a first cut-out region of the one or more cut-out regions compensates a radiation pattern associated with a corresponding one of the one or more plated holes.

In Example 17, the patch antenna structure of any examples 12-16 can optionally include a second conductive patch on a second layer of the structure, the second layer between the first layer and the ground layer and spaced apart from the first layer by a dielectric material, where the first signal feed is electrically coupled to one of the first conductive patch or the second conductive patch and capacitively coupled to the other one of the first conductive patch or the second conductive patch.

In Example 18, the patch antenna structure of any examples 12-17 can optionally include a second signal feed to couple another signal to the first conductive patch, where the first signal feed is associated with a first polarization, and the second signal feed is associated with a second polarization different from the first polarization.

In Example 19, the patch antenna structure of any examples 12-18 can optionally include where a first plated hole of the one or more plated holes is for a shielding via and is proximate to the first signal feed.

Example 20 includes an antenna array apparatus, including a plurality of antenna elements, where a first antenna element of the plurality of antenna elements includes a first conductive patch including one or more perforations at a periphery of a first side of the first conductive patch, and one or more extended conductive portions at a second side of the first conductive patch, the second side opposite the first side; a ground plane vertically below the first conductive patch and spaced apart from the first conductive patch; and a first signal feed coupled to the first conductive patch; and beamformer circuitry coupled to one or more of the plurality of antenna elements, where the beamformer circuitry includes a plurality of beamformer channels, where a first beamformed channel of the plurality of beamformer channels is coupled to the first signal feed.

In Example 21, the antenna array apparatus of example 20 can optionally include where the first antenna element further includes a second conductive patch between the first conductive patch and the ground plane and spaced apart from the first conductive patch by a dielectric material, and the first signal feed is electrically coupled to one of the first conductive patch or the second conductive patch and capacitively coupled to the other one of the first conductive patch or the second conductive patch.

In Example 22, the antenna array apparatus of any of examples 20-21 can optionally include where the first antenna element further includes a second signal feed coupled to the first conductive patch, where the first signal feed is associated with a first polarization, and the second signal feed is associated with a second polarization different from the first polarization.

Variations and Implementations

While embodiments of the present disclosure were described above with references to exemplary implementations as shown in FIGS. 1A-1B, 2, 3A-3B, and 4-7, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, frequency selective coupling elements, phase-shifters, vias, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to dual wideband antennas, in various communication systems.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the antenna structures and/or antenna apparatuses shown in FIGS. 1A-1B, 2, 3A-3B, and 4-7) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. A patch antenna structure, comprising:
  a first conductive patch on a first layer of the patch antenna structure, wherein the first conductive patch includes:
    one or more perforations at a periphery of a first side of the first conductive patch, and
    one or more extended conductive portions at a second side of the first conductive patch, the second side opposite the first side;
  a ground plane on a ground layer of the patch antenna structure, the ground layer spaced apart from the first layer;
  a first signal feed to couple a signal to the first conductive patch; and
  a second signal feed to couple another signal to the first conductive patch, wherein the first signal feed is associated with a first polarization, and wherein the second signal feed is associated with a second polarization different from the first polarization.

2. The patch antenna structure of claim 1, wherein each of the one or more perforations has a corresponding one of the one or more extended conductive portions.

3. The patch antenna structure of claim 1, wherein a location of a first perforation of the one or more perforations is symmetrical to a location of a corresponding one of the one or more extended conductive portions at a center axis of the first conductive patch, the center axis extending from a third side to a fourth side of the first conductive patch, the third side is opposite the fourth side and adjacent to the first and second sides.

4. The patch antenna structure of claim 1, wherein an area of a first extended conductive portion of the one or more extended conductive portions is based on an area of a corresponding one of the one or more perforations.

5. The patch antenna structure of claim 1, wherein a first extended conductive portion of the one or more extended conductive portions compensates a radiation pattern associated with a corresponding one of the one or more perforations.

6. The patch antenna structure of claim 1, further comprising:
  a second conductive patch on a second layer of the patch antenna structure, the second layer between the first layer and the ground layer and spaced apart from the first layer by a dielectric material.

7. The patch antenna structure of claim 6, wherein the first signal feed is electrically coupled to the first conductive patch and capacitively coupled to the second conductive patch.

8. The patch antenna structure of claim 6, wherein the first signal feed is electrically coupled to the second conductive patch and capacitively coupled to the first conductive patch.

9. The patch antenna structure of claim 8, wherein the first conductive patch and the second conductive patch are radiating elements, and wherein the patch antenna structure is configured to wirelessly transmit a radio frequency signal.

10. The patch antenna structure of claim 1, further comprising a plurality of shielding vias, wherein:
  the first signal feed comprises an excitation via;
  the plurality of shielding vias surround the excitation via to provide isolation; and
  a first perforation of the one or more perforations accommodates a first shielding via of the plurality of shielding vias.

11. The patch antenna structure of claim 1, wherein a first perforation of the one or more perforations accommodates a shielding via and is proximate to the first signal feed.

12. A patch antenna structure, comprising:
  a first conductive patch on a first layer of the patch antenna structure, wherein the first conductive patch includes:
    one or more plated holes at a periphery of a first side of the first conductive patch, and
    one or more cut-out regions at a second side of the first conductive patch, the second side opposite the first side;
  a ground plane on a ground layer of the patch antenna structure, the ground layer spaced apart from the first layer;
  a first signal feed to couple a signal to the first conductive patch; and
  a second signal feed to couple another signal to the first conductive patch, wherein the first signal feed is associated with a first polarization, and wherein the second signal feed is associated with a second polarization different from the first polarization.

13. The patch antenna structure of claim 12, wherein each of the one or more plated holes has a corresponding one of the one or more cut-out regions.

14. The patch antenna structure of claim 12, wherein a location of a first cut-out region of the one or more cut-out regions is symmetrical to a location of a corresponding one of the one or more plated holes at a center axis of the first conductive patch, the center axis extending from a third side to a fourth side of the first conductive patch, the third side is opposite the fourth side and adjacent to the first and second sides.

15. The patch antenna structure of claim 12, further comprising:
  a second conductive patch on a second layer of the structure, the second layer between the first layer and the ground layer and spaced apart from the first layer by a dielectric material,
  wherein the first signal feed is electrically coupled to one of the first conductive patch or the second conductive patch and capacitively coupled to the other one of the first conductive patch or the second conductive patch.

16. The patch antenna structure of claim 12, further comprising a plurality of shielding vias, wherein:
  the first signal feed comprises an excitation via;
  the plurality of shielding vias surround the excitation via to provide isolation; and
  a first plated hole of the one or more plated holes accommodates a first shielding via of the plurality of shielding vias.

17. The patch antenna structure of claim 12, wherein a first plated hole of the one or more plated holes accommodates a shielding via and is proximate to the first signal feed.

18. An antenna array apparatus, comprising:
  a plurality of antenna elements, wherein a first antenna element of the plurality of antenna elements comprises:
    a first conductive patch including:
      one or more perforations at a periphery of a first side of the first conductive patch, and
      one or more extended conductive portions at a second side of the first conductive patch, the second side opposite the first side;

a ground plane vertically below the first conductive patch and spaced apart from the first conductive patch;

a first signal feed coupled to the first conductive patch; and a second signal feed to couple another signal to the first conductive patch, wherein the first signal feed is associated with a first polarization, and wherein the second signal feed is associated with a second polarization different from the first polarization; and beamformer circuitry coupled to one or more of the plurality of antenna elements, wherein the beamformer circuitry comprises a plurality of beamformer channels, wherein a first beamformed channel of the plurality of beamformer channels is coupled to the first signal feed.

19. The antenna array apparatus of claim 18, wherein:

the first antenna element further comprises:

a second conductive patch between the first conductive patch and the ground plane and spaced apart from the first conductive patch by a dielectric material, and the first signal feed is electrically coupled to one of the first conductive patch or the second conductive patch and capacitively coupled to the other one of the first conductive patch or the second conductive patch.

20. The antenna array apparatus of claim 18, wherein the plurality of beamformer channels comprises a second beamformed channel, and wherein a plurality of shielding vias provide isolation between the first signal feed and another signal feed associated with the second beamformed channel.

* * * * *